(12) United States Patent
Gjertsen

(10) Patent No.: US 10,514,243 B2
(45) Date of Patent: Dec. 24, 2019

(54) TOOL FOR MEASURING ANGLES AND LENGTH IN STRUCTURES AND FRAMES

(71) Applicant: Jeffrey Gustav Gjertsen, Austin, TX (US)

(72) Inventor: Jeffrey Gustav Gjertsen, Austin, TX (US)

( * ) Notice: Subject to any disclaimer, the term of this patent is extended or adjusted under 35 U.S.C. 154(b) by 18 days.

(21) Appl. No.: 15/655,096

(22) Filed: Jul. 20, 2017

(65) Prior Publication Data
US 2018/0023934 A1    Jan. 25, 2018

Related U.S. Application Data

(60) Provisional application No. 62/493,948, filed on Jul. 21, 2016.

(51) Int. Cl.
| | |
|---|---|
| *G01B 3/08* | (2006.01) |
| *G01B 5/14* | (2006.01) |
| *G01B 3/56* | (2006.01) |
| *G01B 5/00* | (2006.01) |
| *G01B 3/00* | (2006.01) |
| *G01B 5/02* | (2006.01) |
| *G01B 5/24* | (2006.01) |

(52) U.S. Cl.
CPC .............. *G01B 3/08* (2013.01); *G01B 3/004* (2013.01); *G01B 3/563* (2013.01); *G01B 5/0007* (2013.01); *G01B 5/02* (2013.01); *G01B 5/14* (2013.01); *G01B 5/24* (2013.01)

(58) Field of Classification Search
CPC .......... G01B 3/004; G01B 3/08; G01B 3/563; G01B 5/0007; G01B 5/02; G01B 5/14; G01B 5/24

USPC ........................................................... 33/809
See application file for complete search history.

(56) References Cited

U.S. PATENT DOCUMENTS

| | | | | |
|---|---|---|---|---|
| 847,720 | A | * 3/1907 | Barbo | E04F 21/26 33/462 |
| 1,006,948 | A | 10/1911 | Johnson | |
| 1,205,687 | A | * 11/1916 | Verhey et al. | E04F 21/26 33/462 |
| 1,622,158 | A | * 3/1927 | Liberty | E04F 21/26 33/462 |
| 3,991,474 | A | * 11/1976 | Rath | B43L 7/12 33/462 |
| 4,535,542 | A | 8/1985 | Liu | |
| 4,596,075 | A | 6/1986 | Liu | |
| 5,056,238 | A | 10/1991 | Chi | |
| 5,361,504 | A | * 11/1994 | Huang | B25H 1/0085 33/334 |
| 5,440,818 | A | * 8/1995 | Mailhot | B25H 7/02 33/452 |
| 6,105,269 | A | 8/2000 | Kondrat | |
| 6,148,531 | A | 11/2000 | Economaki | |
| 6,332,277 | B1 | * 12/2001 | Owoc | G01C 9/28 33/373 |
| 6,553,683 | B1 | 4/2003 | Klass | |
| 6,766,583 | B2 | 7/2004 | Economaki | |

(Continued)

*Primary Examiner* — Yaritza Guadalupe-McCall

(57) ABSTRACT

The invention is a tool for measuring the distance and angle between two points on two surfaces to measure position of the points and surfaces relative to one another to provide the user with angle and distance measurements which fully define the relationship between the surfaces and points without additional calculations.

5 Claims, 12 Drawing Sheets

(56) References Cited

U.S. PATENT DOCUMENTS

| | | | |
|---|---|---|---|
| 6,776,076 B2* | 8/2004 | Salazar | B23D 59/001 |
| | | | 33/471 |
| 6,796,047 B2 | 9/2004 | Arnott | |
| 6,996,911 B1* | 2/2006 | Dinius | G01B 3/566 |
| | | | 33/371 |
| 8,122,611 B1* | 2/2012 | Kallsen | B43L 7/12 |
| | | | 33/462 |
| 8,256,128 B2 | 9/2012 | Kozykowski | |
| 8,832,950 B1* | 9/2014 | Adams | G01B 3/563 |
| | | | 33/462 |
| 9,021,713 B1* | 5/2015 | Pierson | G01B 3/563 |
| | | | 33/529 |
| 2007/0022856 A1 | 2/2007 | Paine | |
| 2007/0220766 A1 | 9/2007 | Cooke | |
| 2008/0178482 A1* | 7/2008 | Backstrom | B26B 29/06 |
| | | | 33/482 |
| 2008/0271331 A1* | 11/2008 | Allemand | G01C 9/34 |
| | | | 33/371 |
| 2011/0146091 A1* | 6/2011 | Spaulding | G01C 9/26 |
| | | | 33/372 |
| 2018/0023934 A1* | 1/2018 | Gjertsen | G01B 3/08 |
| | | | 33/809 |

* cited by examiner

TOOL FOR MEASURING ANGLES AND LENGTH IN STRUCTURES AND FRAMES

CROSS-REFERENCE TO RELATED APPLICATIONS

The present application claims benefit of priority under 35 U.S.C. § 119(e) to U.S. provisional application 62/493,948 filed Jul. 21, 2016, the entire content of which is incorporated herein by reference for all purposes.

BACKGROUND

Technical Field

Embodiments of the subject of the invention described herein relates to the general field of measurement tools, and more specifically directed to a measurement tool for measuring the distances and angles between points and surfaces.

Discussion of the Background

Techniques and tools for measurement of objects are common in many industries and are generally known in the art. In the construction and fabrication industries, measuring tools are regularly used to perform a number of tasks including; inspecting of completed fabrication, measuring a setup prior to fabricating a workpiece, and measuring to determine the dimensions of a cut needed for a workpiece such as a miter or coping cut. Tools for measuring objects are typically designed to measure a single individual specific dimension in specific circumstances. A tape measure, for example, is designed to measure the distance between two points on one or more surfaces, but does not provide additional dimensional information; such as the angle between two surfaces at two points without additional measurements and calculations by a user. Protractors, another common measuring tool, can measure the angle between two surfaces but only if the surfaces to be measured intersect.

More complex computer driven tools such as optical measuring systems and coordinate measuring systems may reduce the number of measurements or calculations required to measure the spatial relationship of two surfaces relative to one another, however they are expensive and only practical in a limited number of construction and fabrication situations.

Certain fabrication methods, for example miter cutting and coping, require very specific measurements to cut the workpiece. Current methods and tools are limited in their ability to quickly and accurately take measurements for miter and coping cuts especially as the cuts become more complex.

There is a need for improved measuring tools for measuring the spatial relationship between points and the surfaces on which they lie with less cost and effort.

BRIEF SUMMARY OF THE INVENTION

The present disclosure relates to a measuring tool for measuring distance and angles between surfaces. The tool comprising two measurement surface, a longitudinal member, and two angle measuring element connecting the two measurement surface for indicating the distance and angles between the two measurement surface.

According to an embodiment of the invention, the tool includes two measurement surface for placing against surfaces to be measured, a longitudinal member which indicates the distance between the two surfaces to be measured, and two angle measuring element which rotatably connect the measurement surface to each end of the longitudinal member. In this embodiment, the angle measuring element indicate a single angle measurement between the measurement surface and the longitudinal member.

According to another embodiment of the invention tool includes two measurement surface for placing against surfaces to be measured, a longitudinal member which indicates the distance between the two measurement surface, and two angle measuring element which rotatably connect the measurement surface to each end of the longitudinal member. In this embodiment, the angle measuring element indicates two angle measurements between the measurement surface and the longitudinal member.

According to another embodiment of the invention the tool includes two measurement surface for placing against surfaces to be measured, a longitudinal member which indicates the distance between the two measurement surface, and two angle measuring element which rotatably connect the measurement surface to each end of the longitudinal member. In this embodiment, the longitudinal member includes a phase angle measuring element which rotates the ends of the longitudinal member relative to one another and indicates the angle of the angle measurement element on opposite ends of the longitudinal member.

DETAILED DESCRIPTION OF THE INVENTION

Figure 1:
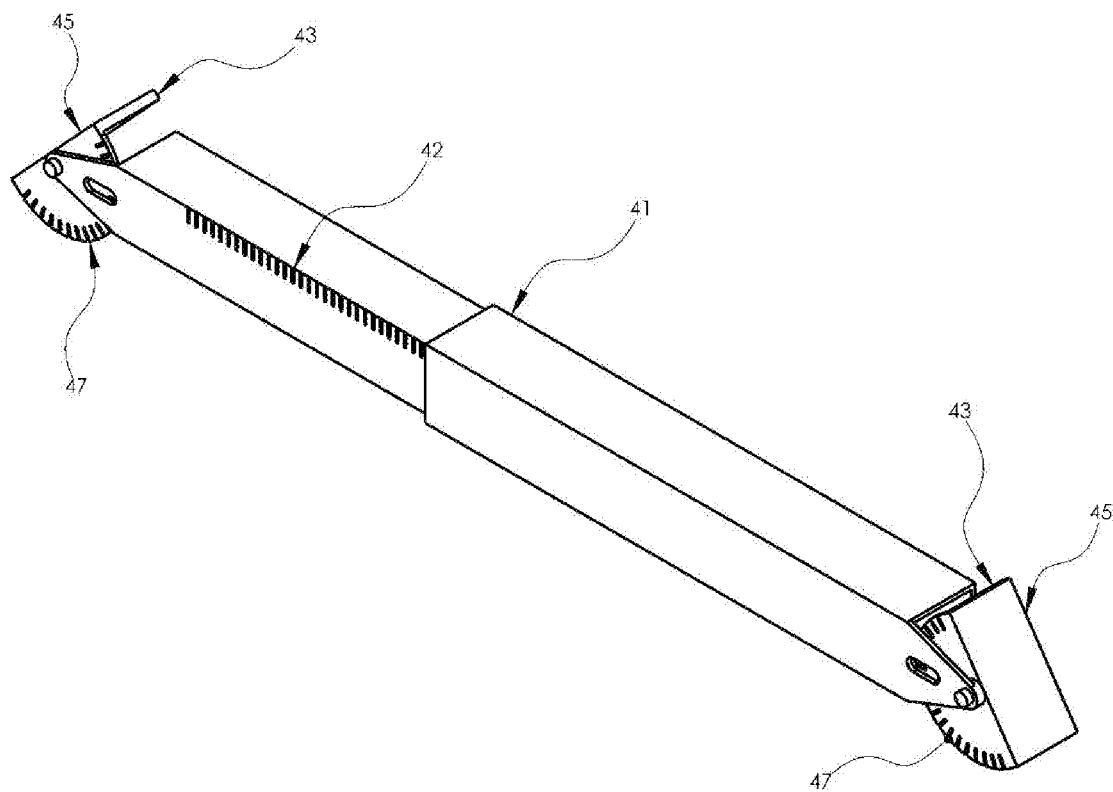
FIG. 1 shows an iso view of a simple angle measuring tool.
Figure 2:
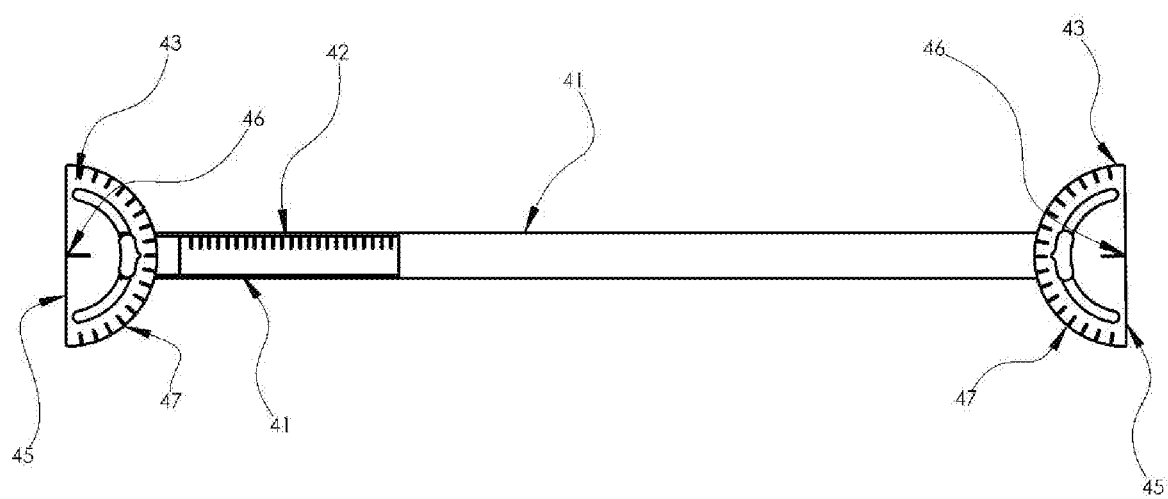
FIG. 2 shows a top view of a simple angle measuring tool.
Figure 3:
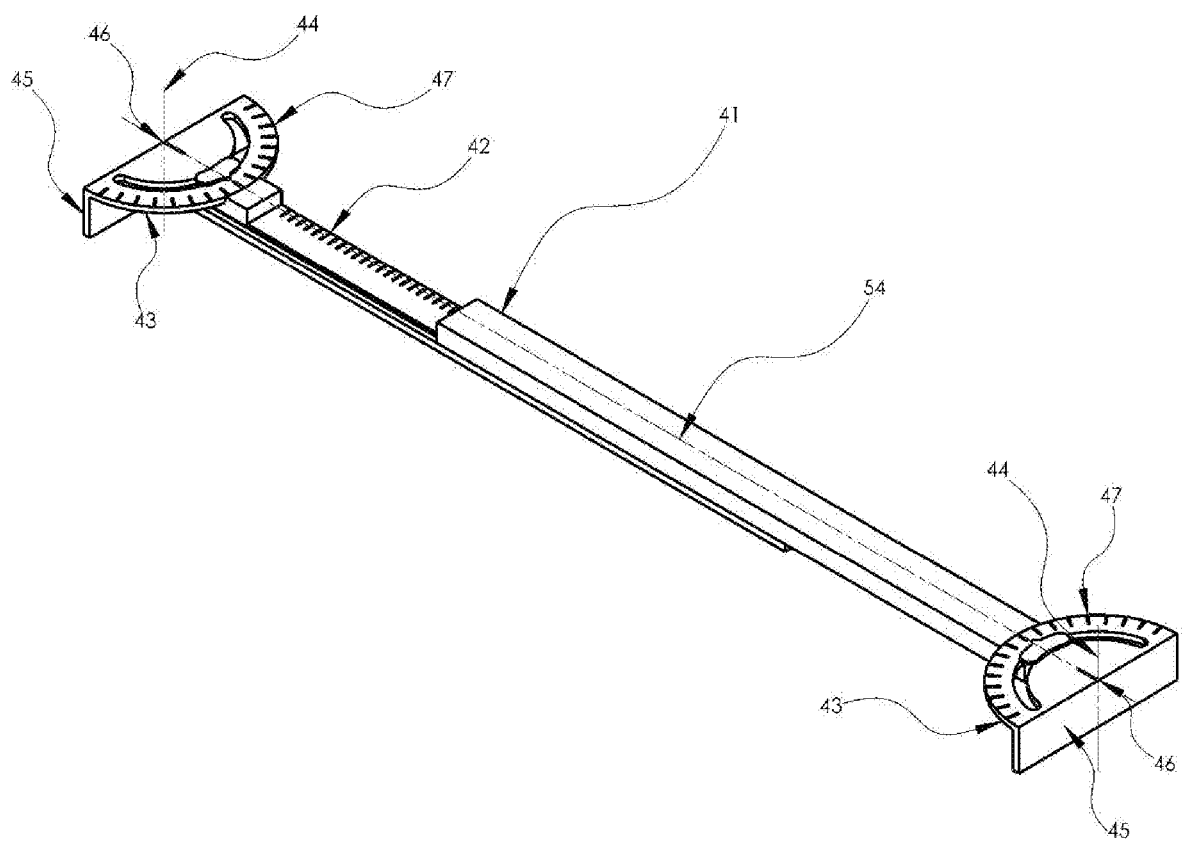
FIG. 3 shows an isometric view of a simple angle measuring tool.
Figure 4:
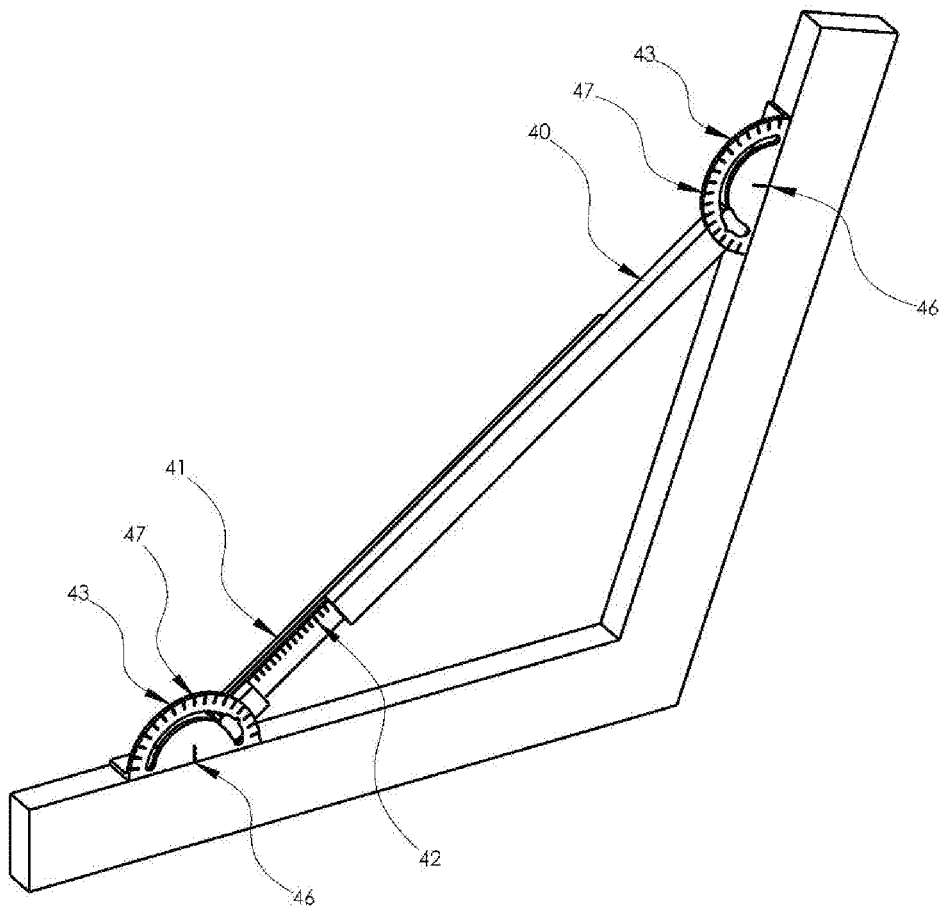
FIG. 4 shows an isometric view of a simple angle measuring tool in use to measure for a simple miter in an existing structure.
Figure 5:
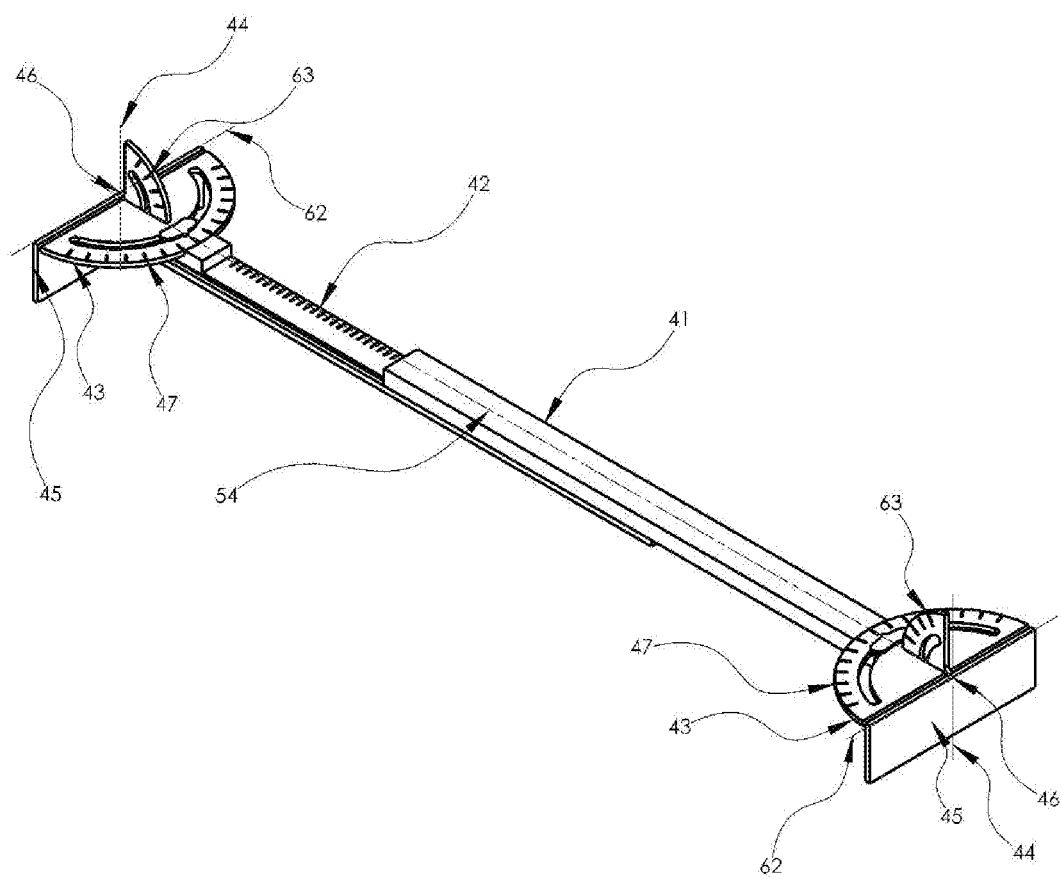
FIG. 5 shows an isometric view of a compound angle measuring tool.
Figure 6:
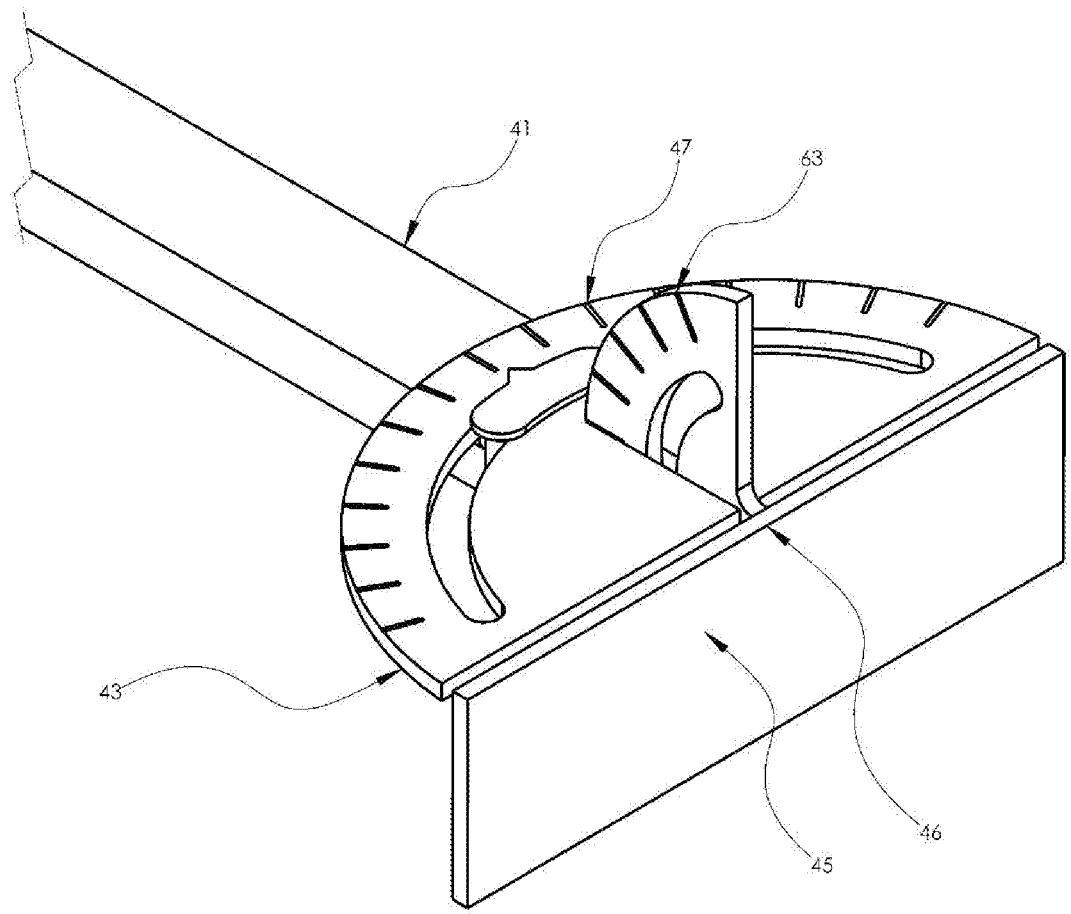
FIG. 6 shows a close up isometric view of one end of the compound angle measuring tool.
Figure 7:
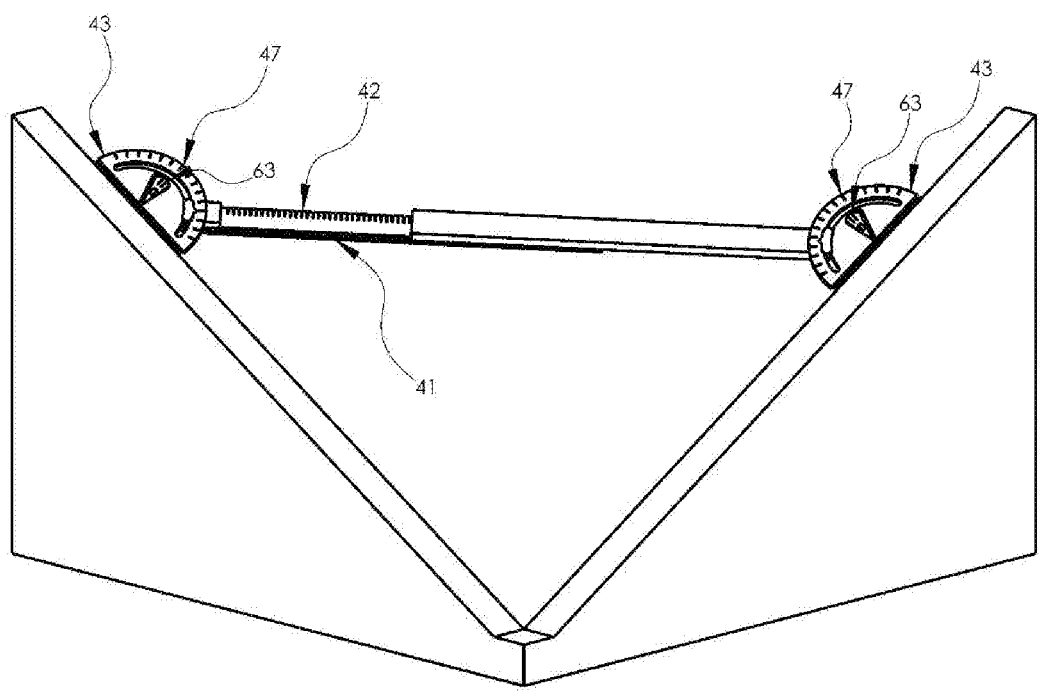
FIG. 7 shows a front isometric view of the compound angle measuring tool in use to measure a compound angle in an existing structure.
Figure 8:
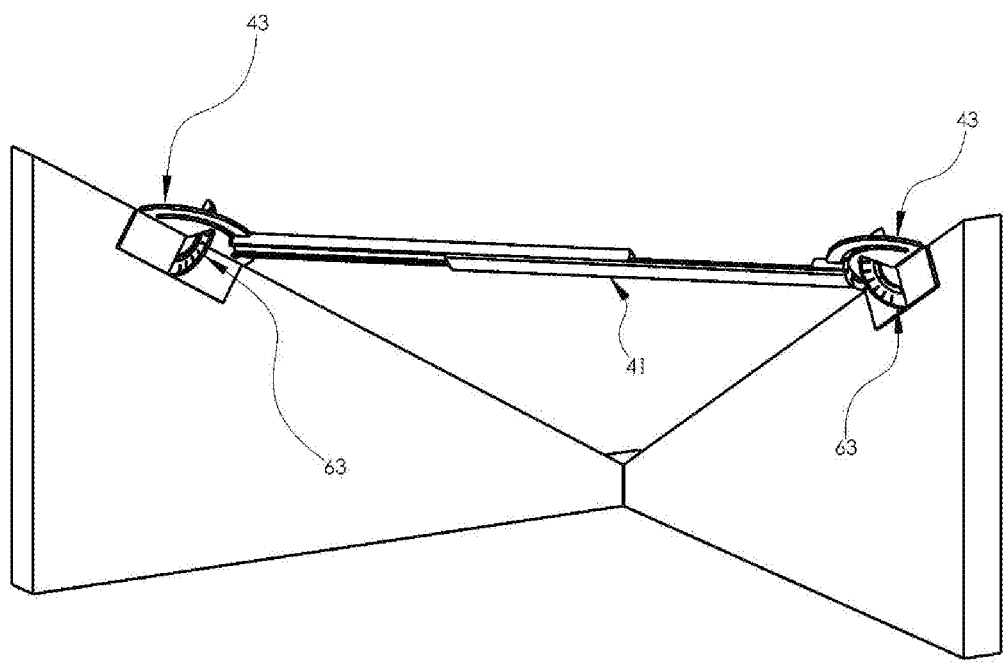
FIG. 8 shows a front isometric view of the compound angle measuring tool in use to measure a compound angles in an existing structure.
Figure 9:
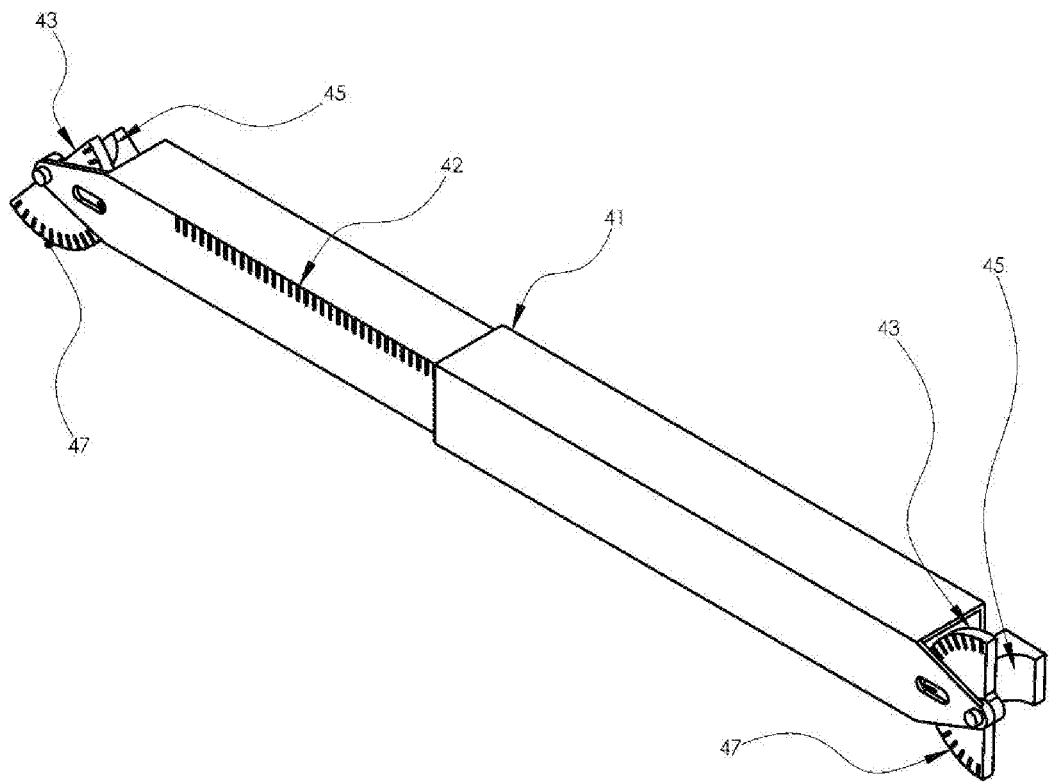
FIG. 9 shows an isometric view of the simple curved surface measuring tool.

The following description of the exemplary embodiments refers to the accompanying drawings. The same reference numbers in different drawings identify the same or similar element. The following detailed description does not limit the invention. Instead, the scope of the invention is defined by the appended claims.

Reference throughout the specification to "one embodiment" or "an embodiment" or similar phrase means that a particular feature, structure or characteristic described in connection with an embodiment is included in at least one embodiment of the subject matter disclosed. Thus, the appearance of the phrases "in one embodiment" or "in an embodiment" or similar phrase in various places throughout the specification is not necessarily referring to the same embodiment. Further, the particular features, structures or characteristics may be combined in any suitable manner in one or more embodiments.

Embodiments of the present invention are directed towards a tool for measuring the distance and one or more angles between two points on two surfaces with a single measurement. The surfaces to be measured may take a variety of shapes including planar and curved surfaces. These measured points and surfaces can be on a single structure or workpiece or may be on two separate structures or workpieces separated by a distance. The ability to accurately and quickly measure the spatial relationship between two points and the surfaces on which those points lie is advantageous in a number of applications. Some embodiments of the invention may define the distance between two points where one or both points are not located on the surfaces to be measured but are substantially defined by the surfaces to be measured. For example, when measuring the distance on a cylindrical curved surface it is generally more beneficial to measure to a point on the centerline of the cylindrical surface rather than a point on the cylindrical surface. Some other applications may benefit from measuring to a point which is offset from the surface by some distance.

Exemplary embodiments include two measurement surfaces (45) which are placed on the surface to be measured of a structure or workpiece. FIGS. 4, 7, 8, and 12 show several exemplary embodiments where the measurement surface (45) are mated to points on surfaces to be measured. In some exemplary embodiments, such as the embodiments shown in FIGS. 1-8 include measurement surface (45) which are planar and, when mated to a planar surface to be measured, aligns the planar measurement surface (45) to be coplanar with the planar surface to be measured. Certain other embodiments, shown in FIGS. 9-12, include measurement surface (45) which are curved for mating to a curved surface. In these embodiments, the curved surface is shaped to mate to a surface with a circular cross section. In other embodiments, the measurement surface (45) may take the form of a V block, which may be mated to a curved surface.

In certain exemplary embodiments, such as shown in FIGS. 2-8, a measurement surface (45) includes a measurement point (46), which helps identify the specific point on the surface to be measured which the tool is measuring. In other exemplary embodiments, shown in FIGS. 10-12, the measurement point (46) indicates where along the curved surface to be measured a cross section is taken to establish the center point which is measured. In certain other embodiments the measurement point (46) may indicate an line or area along the measurement surface (45) for aligning the tool with a line or area on the surface to be measured.

In certain other embodiments, it may be advantageous to connect the measurement surface (45) to the surface to be measured. Some embodiments of the invention may include an adhesive pad on the measurement surface (45) which allows for attachment to the surface to be measured to hold the tool in place. Other embodiments of the invention may include a clamp or vise on the measurement surface (45) to aid measurement. Some embodiments of the invention may include magnets or electromagnets on the measurement surface (45) which allows for the measurement surface (45) to attach to ferrous or other metallic surfaces to be measured.

For certain applications, it may be beneficial to be able to change the measurement surface (45) shape as needed to measure a variety of surface shapes. In certain embodiments of the invention, the measurement surface (45) may be detachably removable to allow for exchanging the measurement surface (45) to different shapes and sizes for mating to different surfaces to be measured. For example, certain embodiments may include multiple removable measurement surface (45) to mate with multiple tube diameters.

In certain other embodiments, the measurement surface (45) may also incorporate a level indicator such as a bubble level, digital level, dial level, or other level indicating device generally known in the art to aid in the positioning of the measurement surface (45).

Exemplary embodiments include a longitudinal member (41) and two angle measuring element (43) that connects the two measurement surface (45), which indicates the dimensional relationship between the two points on the two surfaces to be measured. The two angle measuring element (43) and longitudinal member (41) between the two measurement surface (45) vary depending on the application for the invention, which determines how many and which dimensions are preferred to define the relationship between two points and the two surfaces to be measured. The exemplary embodiments of FIGS. 1-4 and FIG. 9 measures two angle measurements and a single distance measurement. These two angle measurements and single distance measurement gives a user sufficient dimensions to accurately cut a simple miter in a workpiece, check the distance and parallelism between two surfaces to be measured, or aid in the positioning of two surfaces to be measured to a specific angle and distance prior to assembly or fabrication. An additional exemplary embodiment shown in FIGS. 5-8 includes two angle measuring element (43) and a longitudinal member (41) between the two measurement surface (45) which measures 4 angles and a single distance measurement. These 4 angle measurements and single distance measurement can be used to fully define a compound miter cut in a workpiece and measure between points on surfaces which require additional angle measurements fully define the relationship between the points and surfaces. One exemplary embodiment shown in FIGS. 10-12 measures 3 angles and a distance measurement between points on the centerlines of two curved surfaces. These 3 angle measurements and single distance measurements may be used to fully define a coping cut for a workpiece between the two surfaces to be measured or inspect the geometry between the two curved surfaces to be measured.

The structure between the two measurement surface (45) includes a longitudinal member (41), and two angle measuring element (43) connected at each end of the longitudinal member (41) with each angle measuring element (43) attached to one of the measurement surface (45). The longitudinal member (41) includes two ends where one end is extendable along a longitudinal axis (54). The longitudinal axis runs parallel to the longitudinal member (41) and pierces the two measured points on the measured surface. The longitudinal member (41) includes a longitudinal member linear scale (42) which indicates the distance between the two measurement surface (45).

The angle measuring element (43) include at least one angle measuring scale (47) which indicates the angle of the measurement surface (45) relative to the longitudinal axis (54) of the tool where the longitudinal axis (54) is parallel to the longitudinal member (41). In exemplary embodiments shown in FIGS. 1-4 and 9, each angle measuring element (43) includes a single axis of rotation (44) and single angle measuring scale (47). In these exemplary embodiments each angle measuring element (43) and attached measurement surface (45) rotate on an axis of rotation (44) relative to the longitudinal member (41). The angle measuring scale (47) on each end of the tool indicates the respective angle of the measurement surface (45) relative to the longitudinal axis (54). In the exemplary embodiments shown in FIGS. 1-4 and FIG. 9, the axis of rotation (44) at each end of the tool are parallel. Certain other embodiments may rotate one axis of rotation (44) to be perpendicular to the axis of rotation (44) at the opposite end of the tool or at some other fixed angle relative to the opposite axis of rotation (44). These exemplary embodiments in FIGS. 1-4 and FIG. 9 indicate two angle measurements and a single distance measurement.

In an exemplary embodiment shown in FIGS. 5-8, each angle measuring element (43) includes a first (44) and a second (62) axis of rotation and a first (47) and second (63) angle measuring scale. In this exemplary embodiment the second axis of rotation (62) rotates relative to the longitudinal axis (54) around the first axis of rotation (44) and the first angle measuring scale (47) indicates the angle between the longitudinal member (41) and the second axis of rotation (62). The measurement surface (45), being parallel to the second axis of rotation (62), rotates around the second axis of rotation (62) with the second angle measuring scale (63) indicating the angle of the measurement surface (45) relative to a plane defined by the longitudinal axis (54) and the second axis of rotation (62). This exemplary embodiment shown in FIGS. 5-8 indicate four angle measurements and a single distance measurement.

Figure 10:
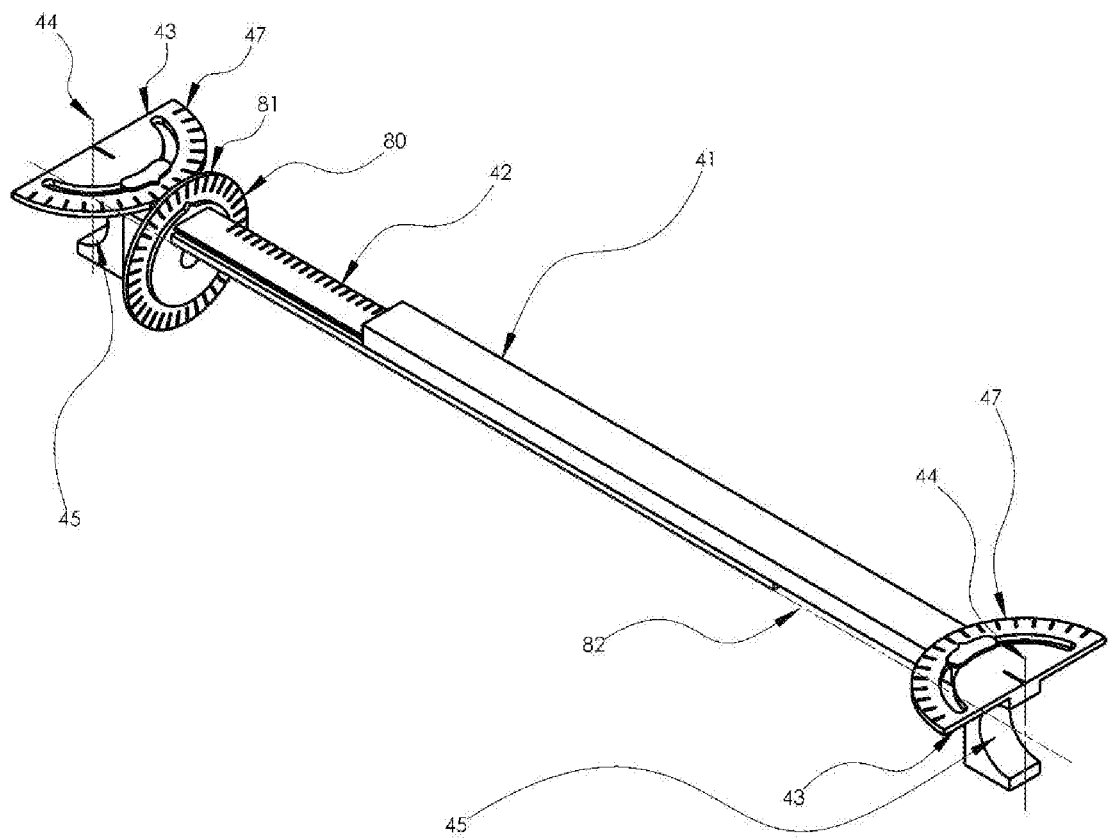
FIG. 10 shows an isometric view of the curved surface angle measuring tool with phase angle.
Figure 11:
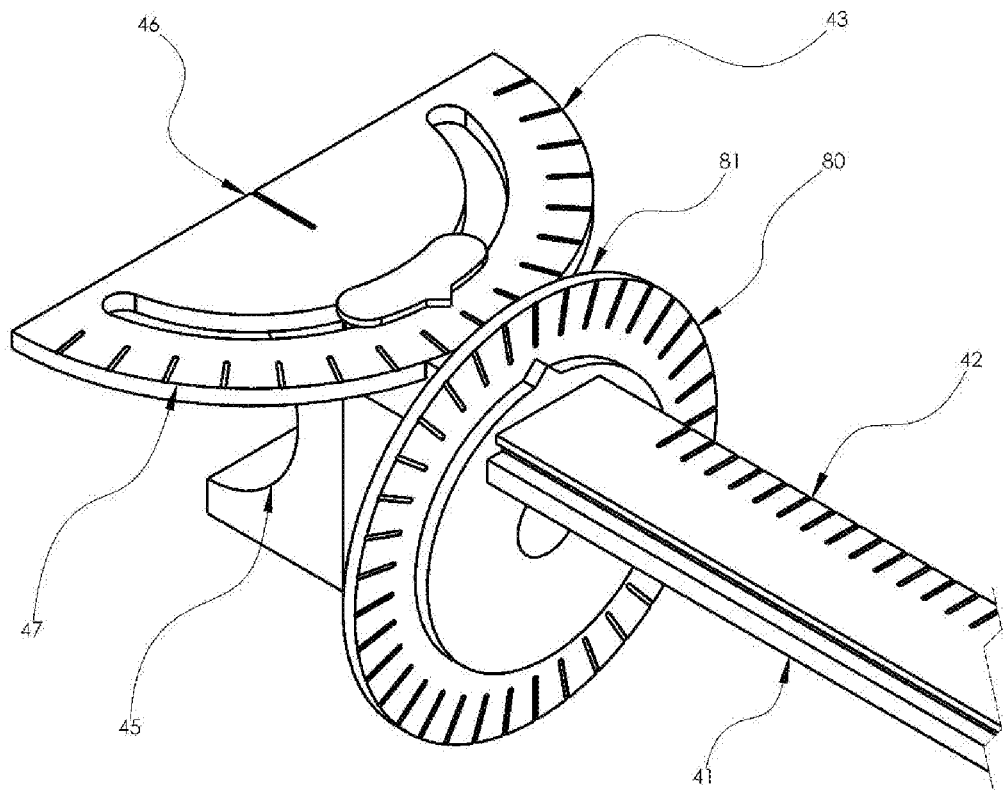
FIG. 11 shows an isometric close up view of the curved surface angle measuring tool end which includes the phase angle measurement element.
Figure 12:
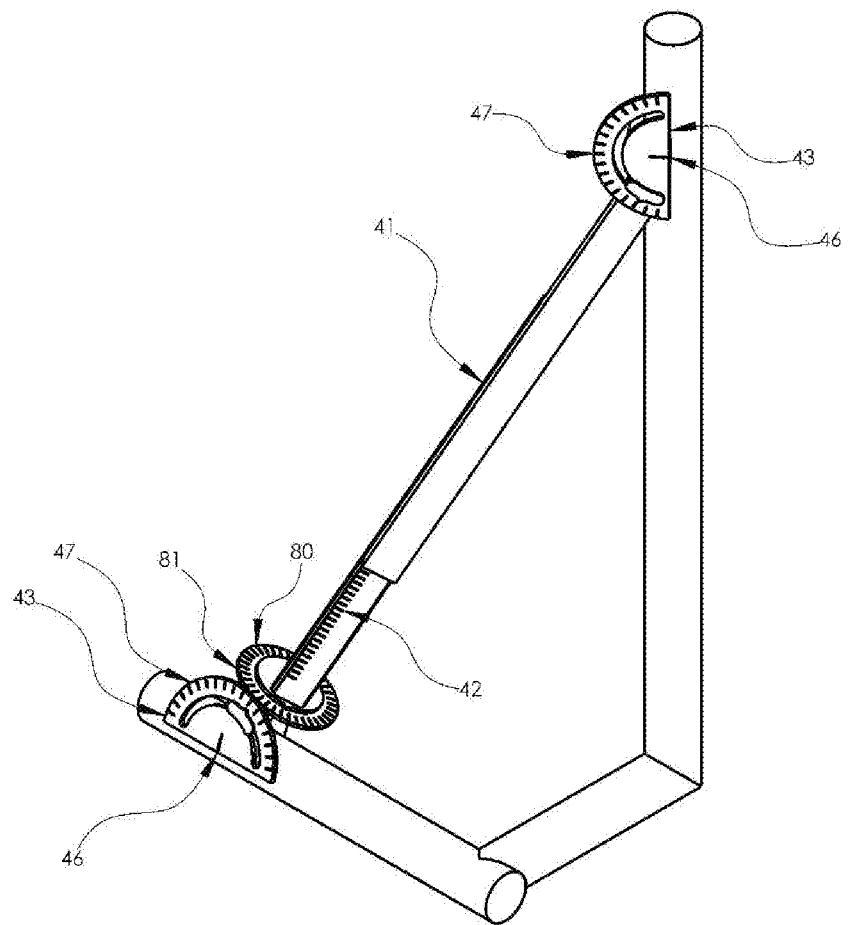
FIG. 12 shows an isometric view of the curved surface angle measuring tool in use to measure between two cylinders in an existing structure.

In another exemplary embodiment shown in FIGS. 10-12, the longitudinal member (41) includes a phase angle measuring element (81). The phase angle measuring element (81) rotates the angle measuring element (43) at one of the longitudinal member (41) ends relative to the other around the phase angle axis of rotation (82). The phase angle measuring element (81) includes a phase angle measuring scale (80) which indicates the angle of the axis of rotation (44) at one end of the longitudinal member (41) relative to the axis of rotation (44) at the opposite end of the longitudinal member (41). In this exemplary embodiment each angle measuring element (43) includes a single axis of rotation (44) and angle measuring scale (47). This exemplary embodiment shown in FIGS. 10-12 indicate three angle measurements and a single distance measurement.

Longitudinal Member:

The extension and retraction of the longitudinal member (41) can be accomplished by a variety of mechanical designs commonly known in the art. Exemplary embodiments shown in FIGS. 1 and 9 may use a telescoping tube to extend the ends. Other exemplary embodiments shown in FIGS. 2-8 and FIGS. 10-12 may have two sliding surfaces with guides on one or both to allow for linear motion. Still other embodiments may use a coiled extendable length measuring tape where one primary angle measuring element (43) is located on the extendable tape end and the other primary angle measuring element (43) is located on the coil end of the extendable tape measure. Certain other embodiments of the invention may use a folding ruler to extend the end. Still other embodiments may have a portion of the longitudinal member which is replaceable with different structure lengths to extend and retract the end.

The longitudinal member linear scale (42) in the exemplary embodiments in the figures are shown as a ruled scale, however other embodiments of the invention may accomplish the linear measurement with a variety of linear measurement devices commonly known in the art. Some embodiments of the invention may use a linear encoder that transmits the measurement to a digital electronic display on the device and/or to a separate electronic device such as a computer or other mobile electronic device. Other embodiments of the invention may use a Vernier scale to increase the accuracy of the length measurement.

In other embodiments of the invention the longitudinal member (41) may also incorporate a level indicator such as a bubble level, digital level, dial level, or other level indicating function generally known in the art. Other embodiments of the invention may include features to the longitudinal member (41) to induce stiction in to the extension and retraction to aid in holding measured dimensions once in position. Features for adding stiction to the device may include incorporating a higher friction element between sliding surfaces, increasing the normal force between the sliding surfaces, or other means of adding stiction which are generally known in the art. Some embodiments of the invention may include a locking or clamping mechanism to the longitudinal member (41) to hold a dimension in position.

Phase Angle Measuring Element:

The phase angle measuring element (81) rotates the angle measuring element (43) at one of the longitudinal member (41) ends relative to the other around the phase angle axis of rotation (82). The rotation around the phase angle axis of rotation (82) can be accomplished in a number of ways that are generally known in the art. Exemplary embodiment shown in FIGS. 10 through 12 use a bushing or bearing to rotate the angle measuring element (81). Other embodiments of the invention may allow for rotation in a telescoping tube which also functions as the extension for the longitudinal element (41).

In other embodiments of the invention the phase angle measuring element (81) may also include features to induce stiction in to the rotation to aid in holding measured dimensions once in position. Features for adding stiction to the device may include incorporating a higher friction element between sliding surfaces, increasing the normal force between the sliding surfaces, or other means of adding stiction which are generally known in the art. In still other embodiments of the invention may include a locking or clamping mechanism to the phase angle measuring element (81) to hold a dimension in position.

Some embodiments of the invention may include an digital angle measurement encoder for the phase angle measurement scale (80) that transmits the angle measurements to a digital electronic display on the device and/or to a separate electronic device such as a computer or other mobile electronic device.

Angle Measuring Element:

The angle measuring element (43) attached to each end of the longitudinal member (41) rotate the measurement surface (45) around one or two axis of rotation (44)(62) as described and shown in the exemplary embodiments. The rotation around the axis of rotation (44)(62) can be accomplished in a number of ways that are generally known in the art. Exemplary embodiment shown in FIGS. 1 and 9 use a bushing or bearing to rotate the angle measuring element (43) relative to the longitudinal member (41). Other exemplary embodiments of the invention such as those in FIGS. 2-8 and FIGS. 10-12, use a circular slot on the angle measuring element (43) for rotational motion. Some other embodiments may use linkage systems, which are known in the art, that create rotational motion. Some other embodiments with an angle measuring element with two axis of rotation (44)(62) may use a universal joint for the rotational motion of both axis.

Other embodiments of the invention may include features to the angle measuring element (43) to induce stiction in to the rotation to aid in holding measured dimensions once in position. Features for adding stiction to the tool may include incorporating a higher friction element between sliding surfaces, increasing the normal force between the sliding surfaces, or other means of adding stiction which are generally known in the art. Some embodiments of the invention may include a locking or clamping mechanism to the angle measuring element (43) to hold a dimension in position.

Some embodiments of the invention may include an digital angle measurement encoder for the angle measurement scale (47) that transmits the angle measurements to a digital electronic display on the device and/or to a separate electronic device such as a computer or other mobile electronic device.

Materials and Methods of Construction:

The components of the tool can be made of a number of different materials and material combinations including metal, plastic, composite, and wood. The materials in some embodiments may be coated or plated to alter surface characteristics such as the coefficient of friction, hardness and durability. The components can be constructed by a variety of methods commonly known in the art including machining, injection molding, forging, and casting.

What is claimed is:

1. A tool for measuring angles and lengths between surfaces, the tool comprising:
   a longitudinal member having a first end, an extendable second end, and a linear scale;
   an angle measuring element connected to the first end of said longitudinal member and configured to measure the angle between the axis of the longitudinal member and a first measurement surface;
   a second angle measuring element connected to the extendable second end of the longitudinal member and configured to measure the angle between the axis of the longitudinal member and a second measurement surface;
   wherein the linear scale of the longitudinal member gives the linear distance between the two measurement surfaces; and
   wherein the longitudinal member is further comprised of a phase angle measuring element which is configured to measure the angle between at least two angle measuring element.

2. The tool of claim 1 where the phase angle measuring element further comprises at least one clamping mechanism.

3. The tool of claim 1 where the phase angle measuring element further comprises at least one feature to add stiction.

4. The tool of claim 1 where the phase angle measuring scale is an angle measurement encoder.

5. A tool for measuring angles and lengths between surfaces, the tool comprising:
   a longitudinal member having a first end, an extendable second end, and a linear scale;
   an angle measuring element connected to the first end of said longitudinal member and configured to measure the angle between the axis of the longitudinal member and a first measurement surface;
   a second angle measuring element connected to the extendable second end of the longitudinal member and configured to measure the angle between the axis of the longitudinal member and a second measurement surface;
   wherein the linear scale of the longitudinal member gives the linear distance between the two measurement surfaces; and
   wherein at least one angle measuring element is further comprised of a second angle measuring scale rotating about a second axis of rotation and configured to measure a second angle between the axis of the longitudinal member and at least one measurement surface.

* * * * *